(12) United States Patent
Yoshii (10) Patent No.: US 8,014,454 B2
(45) Date of Patent: Sep. 6, 2011

(54) MULTICARRIER COMMUNICATION APPARATUS, MULTICARRIER COMMUNICATION SYSTEM, AND TRANSMISSION POWER CONTROL METHOD

(75) Inventor: Isamu Yoshii, Urayasu (JP)

(73) Assignee: Panasonic Corporation, Osaka (JP)

( * ) Notice: Subject to any disclaimer, the term of this patent is extended or adjusted under 35 U.S.C. 154(b) by 950 days.

(21) Appl. No.: 10/568,450

(22) PCT Filed: Aug. 16, 2004

(86) PCT No.: PCT/JP2004/011750
§ 371 (c)(1),
(2), (4) Date: Mar. 16, 2006

(87) PCT Pub. No.: WO2005/018125
PCT Pub. Date: Feb. 24, 2005

(65) Prior Publication Data
US 2006/0270431 A1 Nov. 30, 2006

(30) Foreign Application Priority Data
Aug. 19, 2003 (JP) ................................ 2003-295613

(51) Int. Cl.
*H04K 1/10* (2006.01)
(52) U.S. Cl. ........ 375/260; 375/267; 455/450; 455/522; 370/343
(58) Field of Classification Search .................... 375/260
See application file for complete search history.

(56) References Cited

U.S. PATENT DOCUMENTS

| | | | | | |
|---|---|---|---|---|---|
| 5,357,284 | A | * | 10/1994 | Todd | 348/486 |
| 6,038,450 | A | * | 3/2000 | Brink et al. | 455/442 |
| 6,125,150 | A | * | 9/2000 | Wesel et al. | 375/265 |
| 6,151,328 | A | * | 11/2000 | Kwon et al. | 370/441 |
| 6,587,510 | B1 | | 7/2003 | Minami et al. | |
| 6,816,453 | B1 | * | 11/2004 | Sakamoto | 370/210 |
| 6,904,283 | B2 | * | 6/2005 | Li et al. | 455/450 |

FOREIGN PATENT DOCUMENTS

| | | |
|---|---|---|
| JP | 11178050 | 7/1999 |
| JP | 11266224 | 9/1999 |

(Continued)

OTHER PUBLICATIONS

PCT International Search Report dated Nov. 22, 2004.

(Continued)

*Primary Examiner* — Shuwang Liu
*Assistant Examiner* — Lihong Yu
(74) *Attorney, Agent, or Firm* — Dickinson Wright PLLC (57) ABSTRACT

A multicarrier communication apparatus capable of reducing an amount of information required for feedback, making a range of transmission power fluctuation small, and achieving rapid convergence on a target transmission power is disclosed. With this apparatus, subcarrier pair determination section (1142) puts a plurality of subcarriers contained in a multicarrier signal into pairs, notifies combining section (106) of information pertaining to the pairs of subcarriers, combines received power of each pair of subcarriers, and outputs combined received power obtained in this manner to command producing section (1146). Target power storage section (1144) stores target power for received power in such a manner that SIR at the subject apparatus becomes a desired SIR. Command producing section (1146) compares combined received power for the pairs of subcarriers and target received power, produces a command indicating a difference in power between these two received powers, and generates a control signal containing the produced command.

5 Claims, 7 Drawing Sheets

FOREIGN PATENT DOCUMENTS

JP   2003169036   6/2003

OTHER PUBLICATIONS

T. Yoshiki, et al.; Performance of a Multilevel Transmit Power Control for the OFDM Subcarrier Adaptive Modulation System, Technical Report of IEICE, SSE2000-71, RCS2000-60 (Jul. 2000), The Institute of Electronics, Information and Communication Engineers, pp. 63-68 with English Abstract.

T. Keller, et al.; "Adaptive Modulation Techniques for Duplex OFDM Transmission," IEEE Transactions on Vehicular Technology, vol. 49, No. 5, Sep. 2000, pp. 1893-1906.

Japanese Office Action dated Aug. 11, 2009.

3GPP TSG RAN WG1 #31, R1-030156 "Modulation diversity for OFDM," Discussion, Tokyo, Japan, Feb. 2003, 8 pages total.

* cited by examiner

FIG.1A

PRIOR ART

FIG.1B

PRIOR ART

MULTICARRIER COMMUNICATION APPARATUS, MULTICARRIER COMMUNICATION SYSTEM, AND TRANSMISSION POWER CONTROL METHOD

TECHNICAL FIELD

The present invention relates to multimedia communication apparatus, a multicarrier communication system and a transmission power control method, and particularly relates to multicarrier communication apparatus, a multicarrier communication system, and a transmission power control method for individually controlling transmission power of a plurality of subcarriers.

BACKGROUND ART

In recent years, various information other than speech such as images and data etc. has become the subject of transmission in mobile communication. This means that requirements with regards to high reliability and high-speed transmission have increased. However, in the event that high-speed transmission is carried out in mobile communication, the influence of wave delays due to multi-paths cannot be ignored, and cause deterioration in transmission characteristics due to frequency-selective fading.

Multicarrier communication typified by OFDM (Orthogonal Frequency Division Multiplexing) methods are noted as one technology for counteracting frequency-selective fading. Multicarrier communication is technology for carrying out high-speed transmission by carrying out data transmission using a plurality of subcarriers for which transmission speed is suppressed to an extent where frequency-selective fading does not occur. In particular, with OFDM methods, the frequencies of the plurality of subcarriers on which data is arranged are mutually orthogonal. The frequency utilization efficiency is therefore the highest within multicarrier communication and can be implemented with comparatively simple hardware. Because of this, OFDM methods are noted as a candidate communication method for adoption in fourth generation mobile communication and are currently being subjected to various examinations.

For example, in non-patent document 1, the application of transmission power control typically employed in CDMA (Code Division Multiple Access) method communication in OFDM methods is being examined. Non-patent document 1 discloses technology for individually controlling transmission power of a plurality of subcarriers.

Figure 1A:
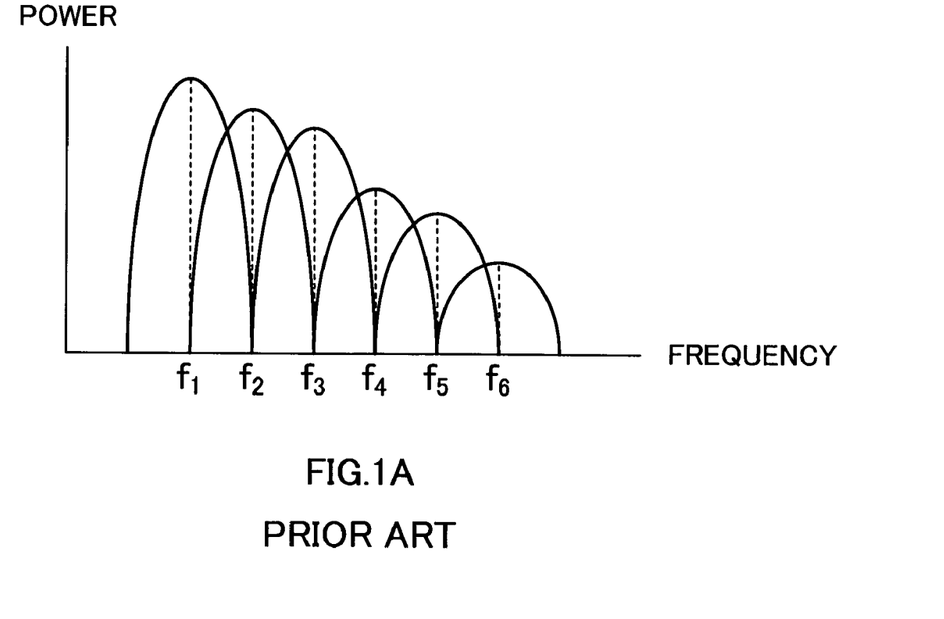
FIG. 1A is a view showing an example transmission power control operation of the related art.
Figure 1B:
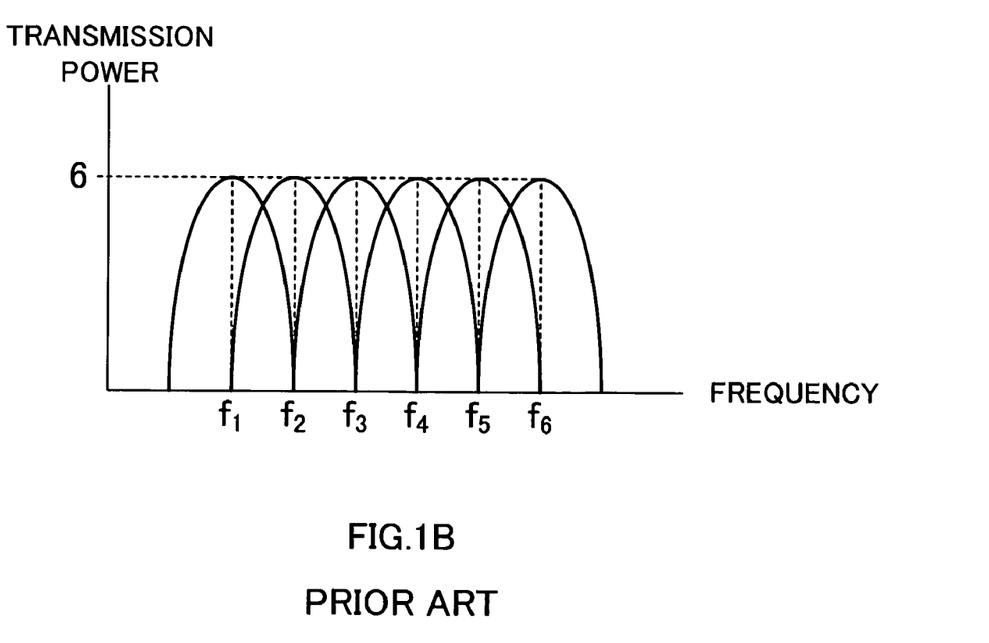
FIG. 1B is a further view showing an example transmission power control operation of the related art.

The operation for individually controlling transmission power of the subcarriers is described giving a specific example with reference to FIG. 1A and FIG. 1B.

FIG. 1A is a view showing power of each subcarrier before carrying out transmission power control. A description is given of the case for controlling transmission power of six mutually orthogonal subcarriers of frequency $f_1$ to $f_6$.

The power of each subcarrier is taken to be, for example, 10 for subcarrier of frequency $f_1$, 8 for subcarrier of frequency $f_2$, 6 for subcarrier of frequency $f_3$, 5 for subcarrier of frequency $f_4$, 3 for subcarrier of frequency $f_5$, and 2 for subcarrier of frequency $f_6$. It is further taken that transmission data is modulated using the QPSK (Quadrature Phase Shift Keying) method.

Under the conditions described above, at a receiving apparatus, when target transmission power per bit for obtaining the desired SIR (Signal to Interference Ratio) is taken to be 3, target transmission power for one symbol (i.e. two bits) is 6 because transmitted data is modulated using the QPSK method. This target transmission power can be determined at either transmission apparatus or receiving apparatus.

In the case of deciding using transmission apparatus, received power at receiving apparatus for subcarriers for all of the frequencies $f_1$ to $f_6$ is fed-back to the transmission apparatus, and target transmission power is determined based on these received powers taking into consideration transmission path loss.

On the other hand, in the case of deciding at receiving apparatus, target transmission force occurring at a transmission apparatus is determined from the received power occurring at the receiving apparatus, and transmission power control commands (hereinafter abbreviated to "TPC") relating to the respective subcarriers are fed-back to the transmission apparatus in such a manner that the transmission power each subcarrier becomes the target transmission power.

As shown in FIG. 1B, the transmission apparatus exerts control in such a manner that transmission power of each subcarrier becomes a target transmission force of 6 according to target transmission power determined by the subject apparatus or TPC commands for each subcarrier fed-back from the receiving apparatus.

Namely, the power of subcarrier of frequency $f_1$ is reduced by 4, the power of subcarrier of frequency $f_2$ is reduced by 2, the power of subcarrier of frequency $f_3$ remains the same, the power of subcarrier of frequency $f_4$ is increased by 1, the power of subcarrier of frequency $f_5$ is increased by 3, and the power of frequency $f_6$ is increased by 4.

It is then possible to suppress the generation of peak power specific to multicarrier communication by carrying out transmission power control, and it is possible to achieve the desired SIR at the receiving apparatus.

(Non-patent Document 1) Yoshiki, Sanpei, Morinaga: "Performance of a Multilevel Transmit Power Control Scheme for the OFDM Subcarrier Adaptive Modulation System", Technical Report of IEICE. SSE2000-71, RCS2000-60 (2000-07), pp. 63-68.

DISCLOSURE OF INVENTION

Problems to be Solved by the Invention

However, in the case of individually controlling transmission power every subcarrier, it becomes necessary for the receiving apparatus to feed back received power for each subcarrier or TPC commands relating to each subcarrier and there is therefore pressure applied to channel capacity of channels going from receiving apparatus to transmission apparatus. In particular, in the case where the number of subcarriers is large, the amount of information to be fed-back is enormous.

Further, in this transmission power control, as described above, control is exerted in such a manner that, for example, power of subcarrier of frequency f1 is lowered by 4, and power of subcarrier of frequency f6 is increased by 4, so that the power of each subcarrier becomes the target transmission power. Here, in the event that fluctuation in frequency-selective fading is substantial etc., the range of fluctuation from power of each subcarrier prior to transmission power control becomes large so that, for example, amplifiers etc. of a large dynamic range become necessary.

Further, in the event of controlling transmission power using TPC commands, transmission power is increased or reduced for each TPC command control range. When the range of fluctuation from the target transmission power is substantial, a long period of time is required until the transmission power converges on the target transmission power.

In order to take into consideration the above problems, it is therefore an object of the present invention to provide a multicarrier communication apparatus, a multicarrier communication system, and a transmission control method capable of reducing the amount of information required for feedback, making the range of transmission power fluctuation small, and rapidly converging to a target transmission power.

Means for Solving the Problem

A multicarrier communication apparatus of the present invention adopts a configuration comprised of a superimposing section superimposing corresponding transmission symbols with groups of subcarriers that are a plurality of subcarriers combined together in predetermined numbers, a control section controlling combined transmission power of the groups of subcarriers the transmission symbols are superimposed upon, and a transmission section transmitting multicarrier signals obtained by controlling the combined transmission power. Namely, the present invention puts a plurality of subcarriers contained in a multicarrier signal into small groups of subcarriers, controls combined power of each group of subcarriers, and ensures that a transmission power per bit of transmission data superimposed with these subcarriers becomes a target transmission power.

ADVANTAGEOUS EFFECT OF THE INVENTION

According to the present invention, the amount of information required as feedback is reduced, a range of fluctuation in transmission power is made smaller, and rapid convergence on a target transmission power is possible.

BEST MODE FOR CARRYING OUT THE INVENTION

The following is a detailed description with reference to the drawings of preferred embodiments of the present invention.

First Embodiment

Figure 2:
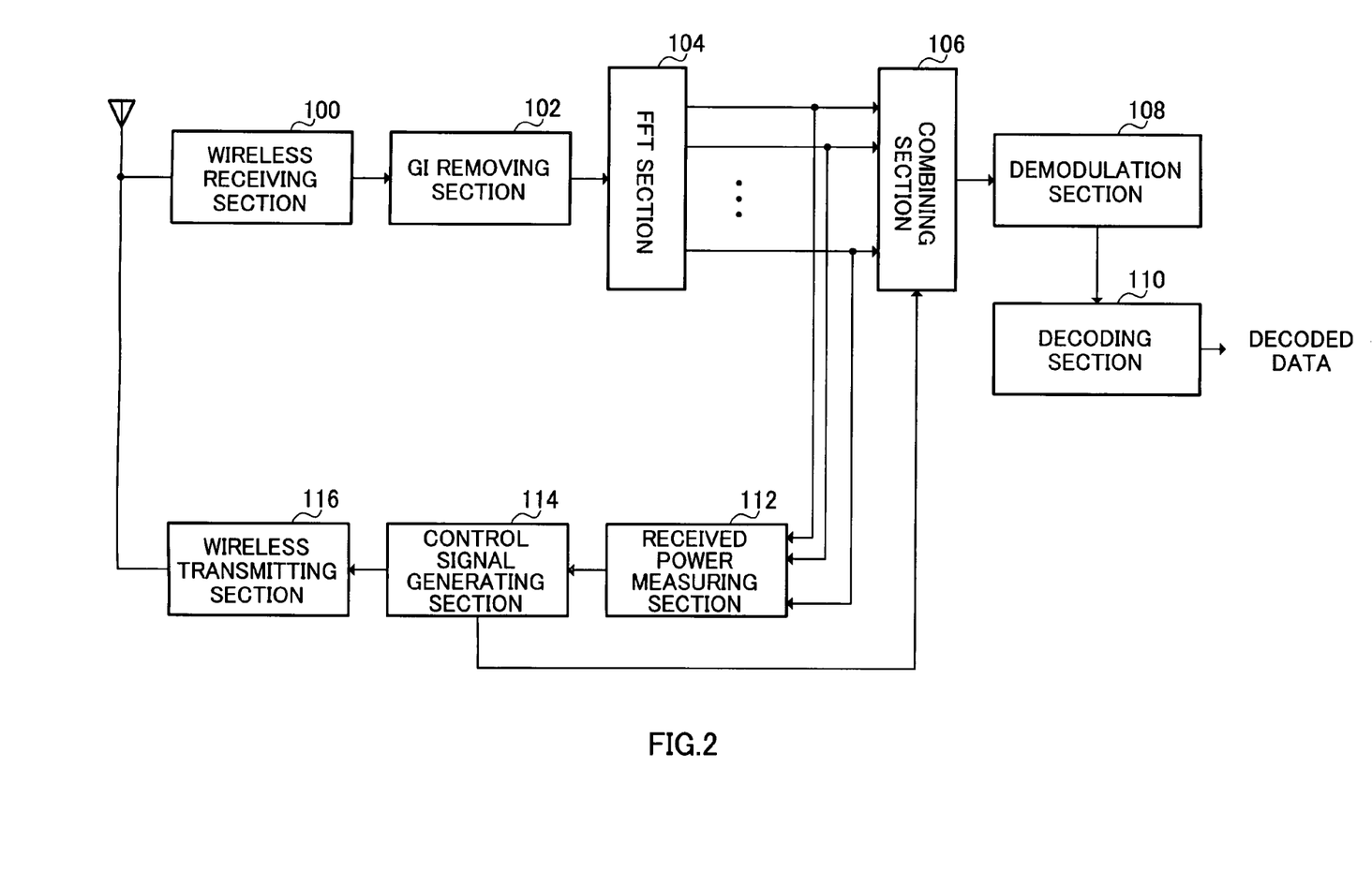
FIG. 2 is a block diagram showing essential parts of a configuration for receiving apparatus of a first embodiment.

FIG. 2 is a block diagram showing the essential parts of a configuration for receiving apparatus of a first embodiment of the present invention. The receiving apparatus shown in FIG. 2 is comprised of a wireless receiving section 100, GI (Guard Interval) removing section 102, FFT (Fast Fourier Transform) section 104, combining section 106, demodulation section 108, decoding section 110, received power measuring section 112, control signal generating section 114, and wireless transmitting section 116.

Wireless receiving section 100 receives signals via an antenna and subjects the received signals to predetermined wireless receiving processing (down conversion, A/D conversion, etc.).

GI removing section 102 removes guard intervals inserted in received signals. A "guard interval" is a section for each symbol of a multicarrier signal where an end section of a symbol is duplicated at the head.

FFT section 104 performs a high-speed Fourier transformation on the received signal and divides up data each subcarrier.

Combining section 106 combines subcarriers constituting pairs in accordance with information relating to pairs of subcarriers described later and outputs this to demodulation section 108.

Demodulation section 108 demodulates pairs of combined subcarriers and output demodulated data to decoding section 110.

Decoding section 110 then decodes the demodulated data and outputs the decoded data.

Received power measuring section 112 measures received power of each subcarrier of the received signal and output measurement results to control signal generating section 114.

Control signal generating section 114 generates a control signal for carrying out transmission power control for the transmission apparatus described later in accordance with received power measurement results for each subcarrier in such a manner that the received power occurring at the subject apparatus becomes the target received power.

Figure 3:
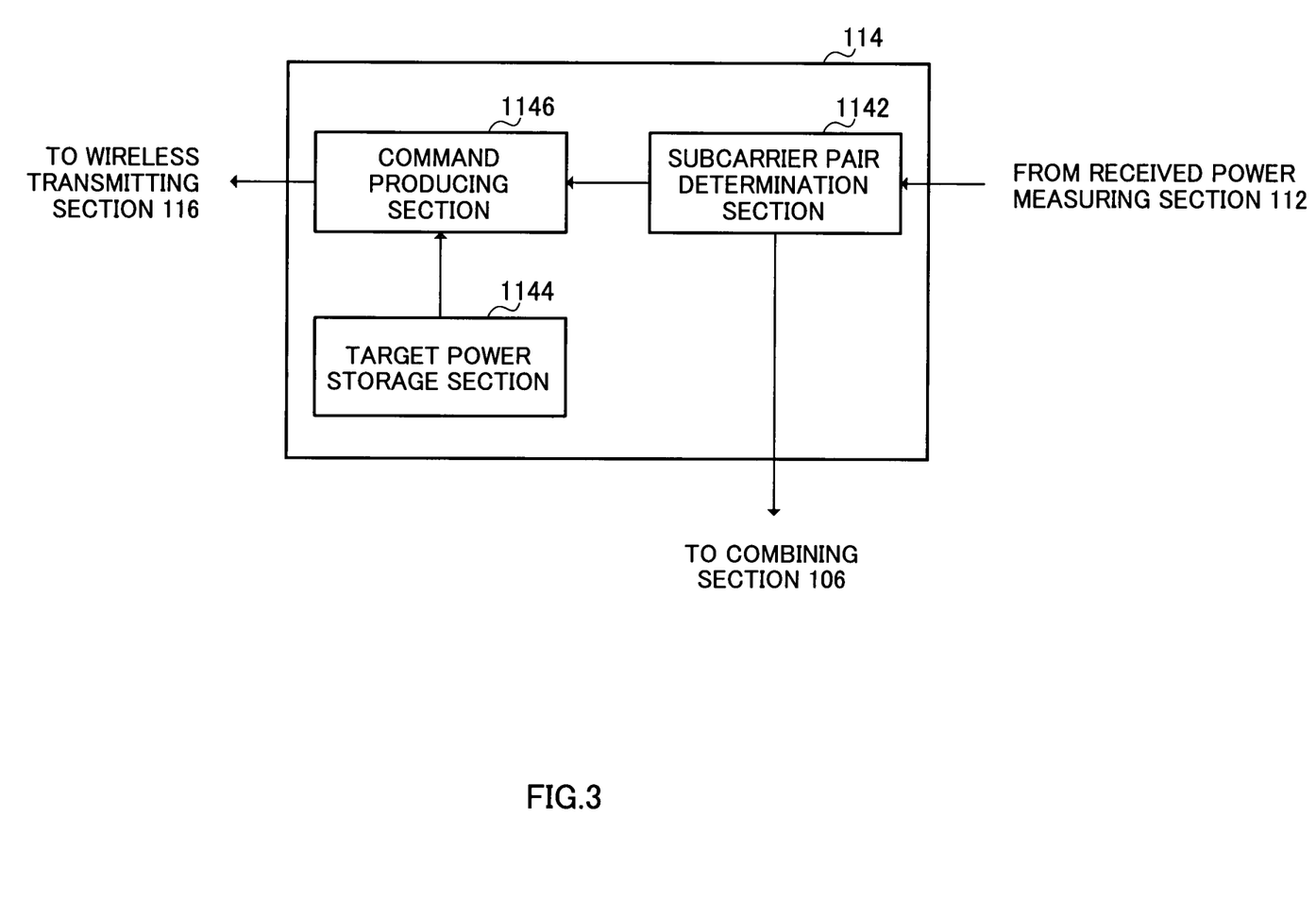
FIG. 3 is a block diagram showing an internal configuration for a control signal generating section of the first embodiment.

Specifically, control signal generating section 114 is comprised of subcarrier pair determination section 1142, target power storage section 1144, and command producing section 1146, as shown in FIG. 3.

Subcarrier pair determination section 1142 puts a plurality of subcarriers contained in a multicarrier signal into pairs, notifies combining section 106 of information pertaining to these pairs of subcarriers, combines received power of each subcarrier pair, and outputs obtained combined received power to command producing section 1146.

It is preferable for the frequencies of the subcarriers of the pairs of subcarriers to be significantly different. By adopting pairs of subcarriers of substantially different frequencies, if one subcarrier deteriorates substantially due to frequency-selective fading, the possibility that the other subcarrier will not have deteriorated that much is high.

Further, in this embodiment, it is taken that the subcarrier pairs are already determined according to frequency but it is also possible for this to be determined along with adjustment according to received power each subcarrier measured by received power measuring section 112. In the event that the subcarrier pair is variable, transmission apparatus described later is notified of the determined subcarrier pair.

Target power storage section 1144 stores target power for received power in such a manner that SIR of the own apparatus becomes the desired SIR. For example, received power per bit is stored as the target power. If the modulation method is then QPSK, as two bits are included for one symbol, the target received power for one symbol is twice the target power stored in the target power storage section 1144. Similarly, if the modulation method is 16QAM, then 4 bits are included for one symbol. The target received power for one symbol is then 4 times the target power stored in the target power storage section 1144. The target received power for one symbol is therefore the target received power for one subcarrier. Further, the target received power for a pair of subcarriers is twice the target received power for one subcarrier.

The command producing section 1146 compares combined received power for the respective pairs of subcarriers and target received power, produces a command indicating the difference in power of these two received powers, and generates a control signal containing the produced command. The difference in power indicated by this command indicates the necessary amount of increase or reduction for combined transmission power of each pair of subcarriers so that if the combined transmission power for each subcarrier pair is increased or decreased by this difference in power, then the combined received power for subcarrier pairs received at the subject apparatus will become equal to the target received signal power.

This means that commands for only half the number of subcarriers are made overall because commands are made so as to correspond to pairs of subcarriers.

Again referring to FIG. 2, wireless transmitting section 116 shown in FIG. 2 subjects a control signal outputted from control signal generating section 114 to predetermined wireless transmission processing (D/A conversion, up-conversion, etc.) for transmission via an antenna.

Figure 4:
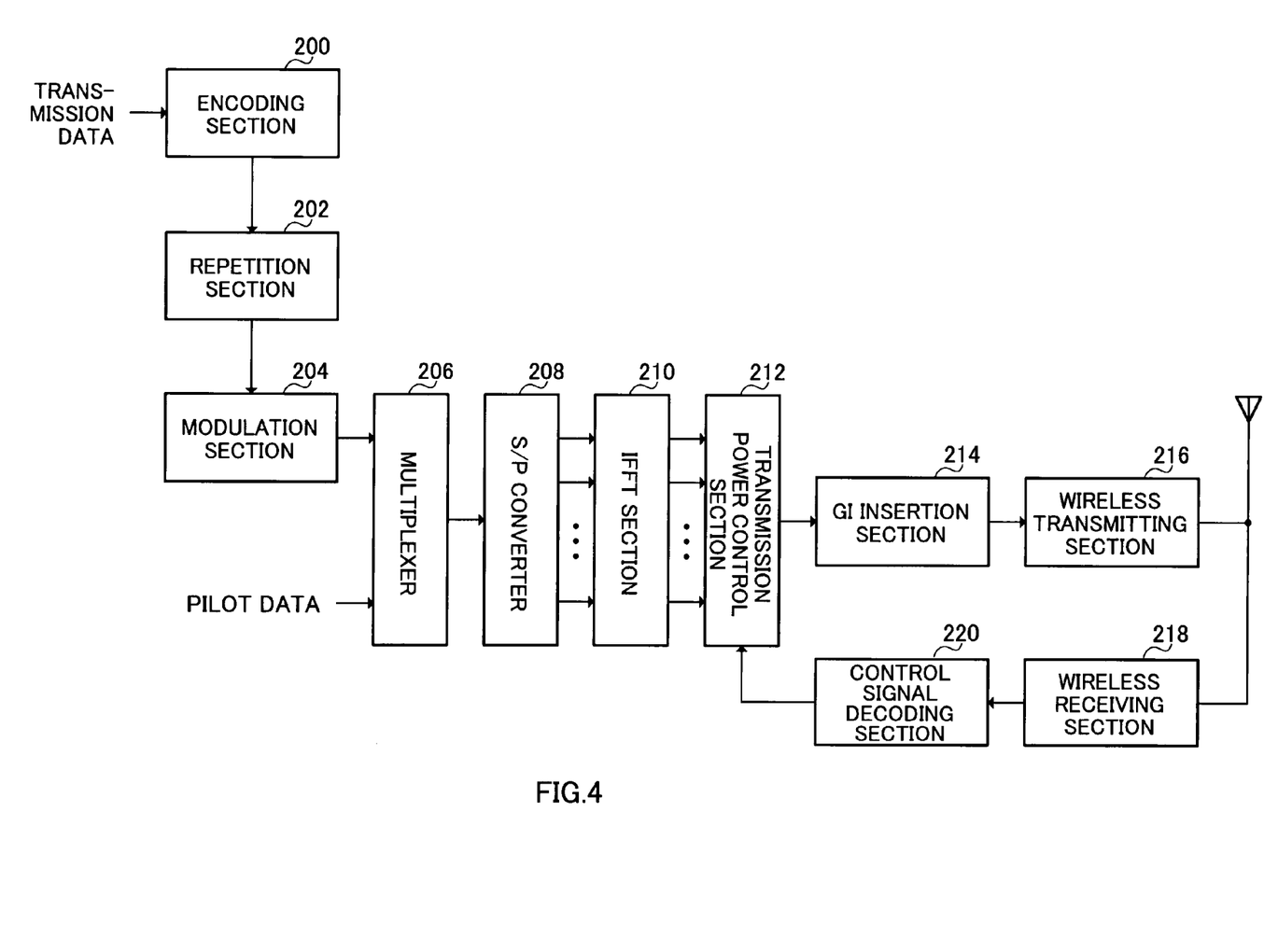
FIG. 4 is a block diagram showing the essential parts of a configuration for a transmission apparatus of the first embodiment.

FIG. 4 is a block diagram showing the essential parts of a configuration for a transmission apparatus of this embodiment. The transmission apparatus shown in FIG. 4 is comprised of an encoding section 200, repetition section 202, modulation section 204, multiplexer 206, S/P converter 208, IFFT (Inverse Fast Fourier Transform) section 210, transmission power control section 212, GI insertion section 214, wireless transmitting section 216, wireless receiving section 218, and control signal decoding section 220.

Encoding section 200 encodes transmitted data and outputs obtained encoded data to repetition section 202.

Repetition section 202 duplicates (repetition) each bit constituting the encoded data and outputs encoded data that has doubled in length to modulation section 204.

Modulation section 204 modulates encoded data outputted by repetition section 202 and outputs the obtained encoded data to multiplexer 206. In this embodiment, modulation section 204 employs 16QAM as a modulation method. Four bits therefore constitute one symbol. However, because repetition is carried out by the repetition section 202, then two of each of the same symbol are obtained, and the amount of information it is possible to transfer per unit time is the same as the case of using QPSK as the modulation method.

Multiplexer 206 multiplexes modulation data outputted by the modulation section 204 and existing pilot data and outputs the obtained multiplexed symbol to S/P converter 208.

S/P converter 208 subjects multiplexed symbols to serial/parallel conversion, and outputs multiplexed symbols for a plurality of sequences to IFFT section 210. S/P converter 208 carries out serial/parallel conversion in such a manner that two of the same symbols obtained by repetition are superimposed on the same subcarrier pair.

IFFT section 210 subjects the plurality of sequences of multiplexed symbols outputted by S/P converter 208 to inverse fast Fourier transformation for superimposition on a plurality of subcarriers. At this time, IFFT section 210 superimposes the same multiplexed symbols on a pair of subcarriers, as described above.

Transmission power control section 212 controls transmission power of each subcarrier in accordance with commands for transmission power control contained in control signals sent by the receiving apparatus and outputs multicarrier signals containing these subcarriers to GI insertion section 214. Specifically, transmission power control section 212 calculates combined power for pairs of subcarriers and increases or decreases calculated combined power by a power difference indicated by a command contained in the control signal. Namely, in the case that, for example, a command indicates to increase the power by 4, transmission power control section 212 increases power of the subcarriers constituting a pair by 2 each.

GI insertion section 214 inserts guard intervals by duplicating bits at the end portion of the multicarrier signal for addition to the head.

After insertion of guard intervals, wireless transmitting section 216 subjects the multicarrier signal to predetermined wireless transmission processing (D/A conversion, up conversion etc.) for transmission via an antenna.

Wireless receiving section 218 receives control signals transmitted by the receiving apparatus and subjects these signals to predetermined wireless receiving processing (down conversion, A/D conversion, etc.).

Control signal decoding section 220 decodes received control signals and outputs commands for transmission power control contained in these control signals to transmission power control section 212.

Next, a description is given of a specific example of a transmission power control operation by a receiving apparatus and transmission apparatus of the embodiment of the configuration described above.

First, a multicarrier signal is received by wireless receiving section 100 of the receiving apparatus of this embodiment shown in FIG. 2 and predetermined wireless receiving processing (down conversion, A/D conversion etc.) is carried out. Guard intervals are then removed from the multicarrier signal by GI removing section 102, the signal is subjected to high-speed Fourier transformation by FFT section 104, and is divided into a plurality of subcarriers.

The plurality of subcarriers is then combined into pairs of subcarriers by combining section 106 in accordance with notification from subcarrier pair determination section 1142 within control signal generating section 114. As the same symbols are superimposed with pairs of subcarriers, it is possible to compensate for the influence of fading incurred by alternate subcarriers. Pairs of combined subcarriers are then demodulated by demodulation section 108, decoded by decoding section 110, and decoded data is obtained.

On the other hand, received power of a plurality of subcarriers is measured by received power measuring section 112. The measured received power of each subcarrier is then outputted to subcarrier pair determination section 1142 within control signal generating section 114.

Combined received power of pairs of subcarriers determined beforehand is then calculated by subcarrier pair determination section 1142 and outputted to command producing section 1146. Further, combining section 106 is notified of subcarrier pair information.

Combined received power of the subcarrier pairs is then compared with target received power stored in target power storage section 1144 by command producing section 1146, and a command indicating difference in power of the combined received power and the target received power is produced. The target received power is received power for making SIR at the receiving apparatus become the desired SIR. The received power may then be increased or reduced by increasing or reducing the transmission power at the transmission apparatus in accordance with the produced command so that the desired SIR is realized.

After the control signal has been included, the command made by the command producing section 114b is subjected to predetermined wireless transmission processing (D/A conversion, up conversion, etc.) by wireless transmitting section 116 and is transmitted via an antenna.

The commands are made to correspond with pairs of subcarriers. This means that a number of commands that is half the number of subcarriers is fed back rather than feeding back information for transmission power control each subcarrier. It is therefore possible to reduce the amount of information required to be fed back for transmission power control.

Further, in this embodiment, combined received power and target received power is compared for pairs of subcarriers. However, subcarriers do not have to be put into pairs, but may also be put into groups of three or more, with combined received power and target received power then being compared. In the case of groups of three or more subcarriers, one command is made for each group of subcarriers. This makes it possible to reduce the amount of information required to be fed back even further.

The control signal transmitted by the receiving apparatus of this embodiment is received by wireless receiving section 218 of the transmission apparatus of this embodiment shown in FIG. 4, and predetermined wireless receiving processing (down conversion, A/D conversion etc.) is carried out. This control signal is then decoded by control signal decoding section 220 and a command contained in the control signal is outputted to transmission power control section 212.

On the other hand, transmission data transmitted by this transmission apparatus is encoded by encoding section 200 and repetition is carried out by repetition section 202. The repetition by repetition section 202 is carried out in such a manner as to double each bit of encoded transmission data. As a result of carrying out repetition in this manner, superimposition of the same bit on both subcarriers constituting a pair becomes possible. Namely, in this embodiment, the repetition section 202 duplicates each bit so as to cause doubling in order to control transmission power of pairs of subcarriers. However, in the case of controlling transmission power taking groups of three subcarriers, the repetition section 202 replicates each bit three times.

Transmission data subjected to repetition is modulated by the modulation section 204 using the 16QAM method. Namely, the encoded bits are such that every four bits constitutes one symbol. At this time, the same bit is modulated two at a time because repetition has been carried out by the repetition section 202. Because of this, the same symbol is outputted two at a time from the modulation section 204. The amount of information it is possible for modulation section 204 to transfer per unit time when carrying out modulation using the 16QAM method is therefore the same as the case of carrying out QPSK method modulation.

Further, in the event that 64QAM modulation is carried out by modulation section 204 during transmission power control taking three subcarriers as a group rather than pairs of subcarriers, the amount of information it is possible to transfer per unit time is the same as the case of carrying out modulation using the QPSK method.

Modulation data obtained through modulation is multiplexed with pilot data by multiplexer 206 and multiplexed symbols are outputted to S/P converter 208. The multiplexed symbols are serial/parallel converted by S/P converter 208 and a plurality of multiplexed symbols are outputted to IFFT section 210 in parallel.

Serial/parallel conversion by S/P converter 208 is carried out in such a manner that two of the same multiplexed symbols are respectively superimposed with pairs of subcarriers. Namely, two of the same multiplexed symbols are outputted from the multiplexer 206 as a result of repetition. However, rather than carrying out serial/parallel conversion in such a manner that the same multiplexed symbols are superimposed with subcarriers of adjacent frequencies, the S/P converter 208 carries out conversion in such a manner that pairs of subcarriers with substantially different frequencies are superimposed with each other.

Multiplexed symbols outputted in parallel from S/P converter 208 are subject to inverse fast-Fourier transformation by IFFT section 210 so as to be superimposed with a plurality of subcarriers. At this time, the same multiplexed symbols are superimposed with pairs of subcarriers. The subcarriers superimposed with the multiplexed symbols are then outputted to transmission power control section 212 and transmission power control is carried out.

In the following, a description is given of a specific example of transmission power control of the transmission power control section 212.

Figure 5A:
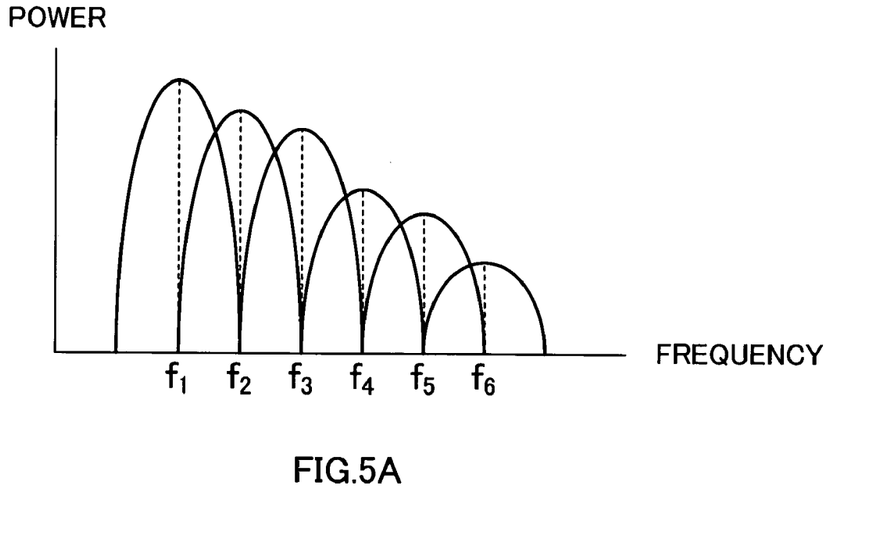
FIG. 5A is a view showing an example of a transmission power control operation of the first embodiment.

FIG. 5A is a view showing an example of power of subcarriers outputted by IFFT section 210. Here, six subcarriers #1 to #6 for frequencies $f_1$ to $f_6$ are outputted and it is taken that power of subcarrier #1 is 10, power of subcarrier #2 is 8, power of subcarrier #3 is 6, power of subcarrier #4 is 5, power of subcarrier #5 is 3, and power of subcarrier #6 is 2. Here, subcarrier #1 and subcarrier #4, subcarrier #2 and subcarrier #5, and subcarrier #3 and subcarrier #6 are respectively taken to be pairs of subcarriers. As described above, the same multiplexed symbols are superimposed on pairs of subcarriers.

In order to carry out comparison with the related art described above in a straightforward manner, at the receiving apparatus of this embodiment, it is taken that a command is produced to reduce combined transmission power for the pair of subcarrier #1 and subcarrier #4 by 3, a command is produced to increase combined transmission power for the pair of subcarrier #2 and subcarrier #5 by 1, and a command is produced to increase combined transmission power for the pair of subcarrier #3 and subcarrier #6 by 4. Namely, commands where combined transmission power for each subcarrier are taken to be 12, in other words, commands to make transmission power per one subcarrier becomes 6 are sent from the receiving apparatus.

In this embodiment, because the combined transmission power of subcarrier #1 and subcarrier #4 is taken to be 12, transmission power of subcarrier #1 is reduced to 8.5 and transmission power of subcarrier #4 is reduced to 3.5. Namely, a command indicating for the combined transmission power to be reduced by 3 is transmitted from the receiving apparatus for the pair of subcarriers. The transmission power of the pair of subcarrier #1 and subcarrier #4 are then each reduced by 1.5.

Similarly, because the combined transmission power of subcarrier #2 and subcarrier #5 is taken to be 12, transmission power of subcarrier #2 is increased to 8.5 and transmission power of subcarrier #5 is increased to 3.5. Namely, a command indicating for the combined transmission power to be increased by 1 is transmitted from the receiving apparatus for the pair of subcarriers. The transmission power of the pair of subcarrier #2 and subcarrier #5 are then each increased by 0.5.

Further, because the combined transmission power of subcarrier #3 and subcarrier #6 is taken to be 12, transmission power of subcarrier #3 is increased to 8 and transmission power of subcarrier #6 is increased to 4. Namely, a command indicating for the combined transmission power to be increased by 4 is transmitted from the receiving apparatus for the pair of subcarriers. The transmission power of the pair of subcarrier #3 and subcarrier #6 are then each increased by 2.

Figure 5B:
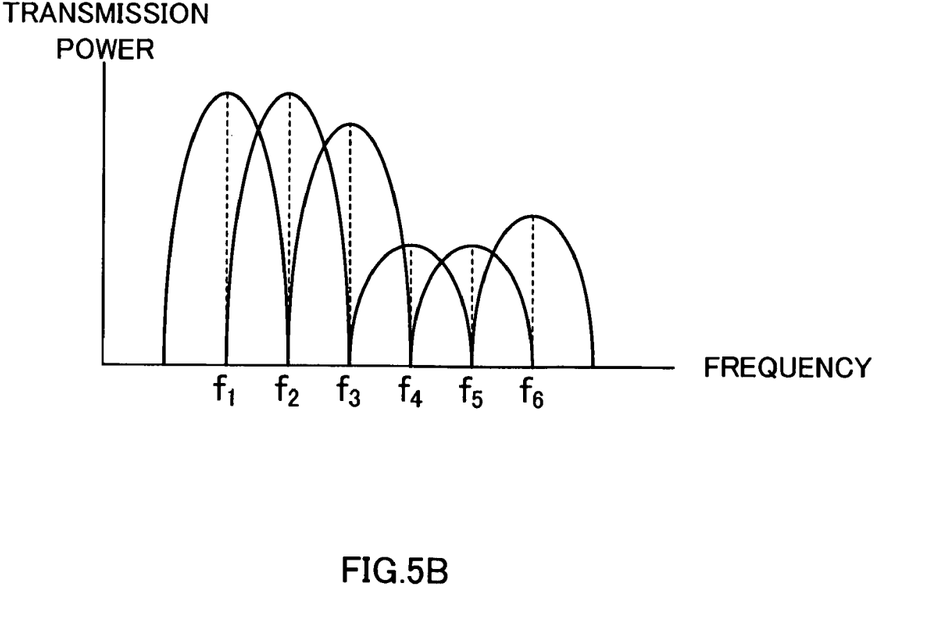
FIG. 5B is a view showing a further example of a transmission power control operation of the first embodiment.

As a result, transmission power of each of subcarriers #1 to #6 becomes as shown in FIG. 5B. Comparing FIG. 5B with FIG. 1B, with regards to the transmission power of each subcarrier in FIG. LB being equal at 6, it can be seen that transmission power of each of the subcarriers in FIG. 5B are not the same.

However, in FIG. 5B, the combined transmission powers for the pair of subcarrier #1 and subcarrier #4, subcarrier #2 and subcarrier #5, and subcarrier #3 and subcarrier #6 are all equal to 12. As the same multiplexed symbols are superimposed at subcarriers of each pair, total transmission power per 1 bit of transmission data is the same as the case in FIG. 5B and the case in FIG. 1B.

On the other hand, in the related art, transmission power of subcarriers is made the same at 6 and it was therefore necessary to increase of decrease transmission power of the subcarriers (subcarriers of frequency f1 and frequency f6) by a maximum of 4. With regards to this, according to this embodiment, it is sufficient to increase transmission power of subcarrier #3 and subcarrier #6 by 2, respectively, at the most. The necessary range of fluctuation of transmission power can therefore be made smaller by controlling combined transmission power by putting subcarriers into pairs.

A multicarrier signal containing subcarriers subject to transmission power control is inserted with guard intervals as a result of GI insertion section 214 duplicating end portions for addition to a top portion, subjected to predetermined wireless processing (D/A conversion, up conversion, etc.) by wireless transmitting section 216 and transmitted via an antenna.

The transmitted multicarrier signal is received by the receiving apparatus of this embodiment, combined into subcarrier pairs, and demodulated and decoded.

According to this embodiment, receiving apparatus feeds back a command indicating a difference in power between combined received power for a pair of subcarriers to transmission apparatus. The transmission apparatus then increases or decreases the combined transmission power of each pair of subcarriers by just the difference in power indicated by the fed-back command. The amount of information it is necessary to feed back is therefore reduced, the range of fluctuation in transmission power is made smaller, and rapid convergence to a target transmission power is possible compared to the case of causing the transmission power for each subcarrier to fluctuate towards individual target transmission powers.

Second Embodiment

A feature of a second embodiment of the present invention is the point of superimposition on respective pairs of subcarriers constituted by an in-phase component (hereinafter referred to as I (In-phase) component) and quadrature component (hereinafter referred to as Q (Quadrature) component) separated during modulation diversity.

The configuration of receiving apparatus of this embodiment is the same as for receiving apparatus of the first embodiment and is therefore not described.

Figure 6:
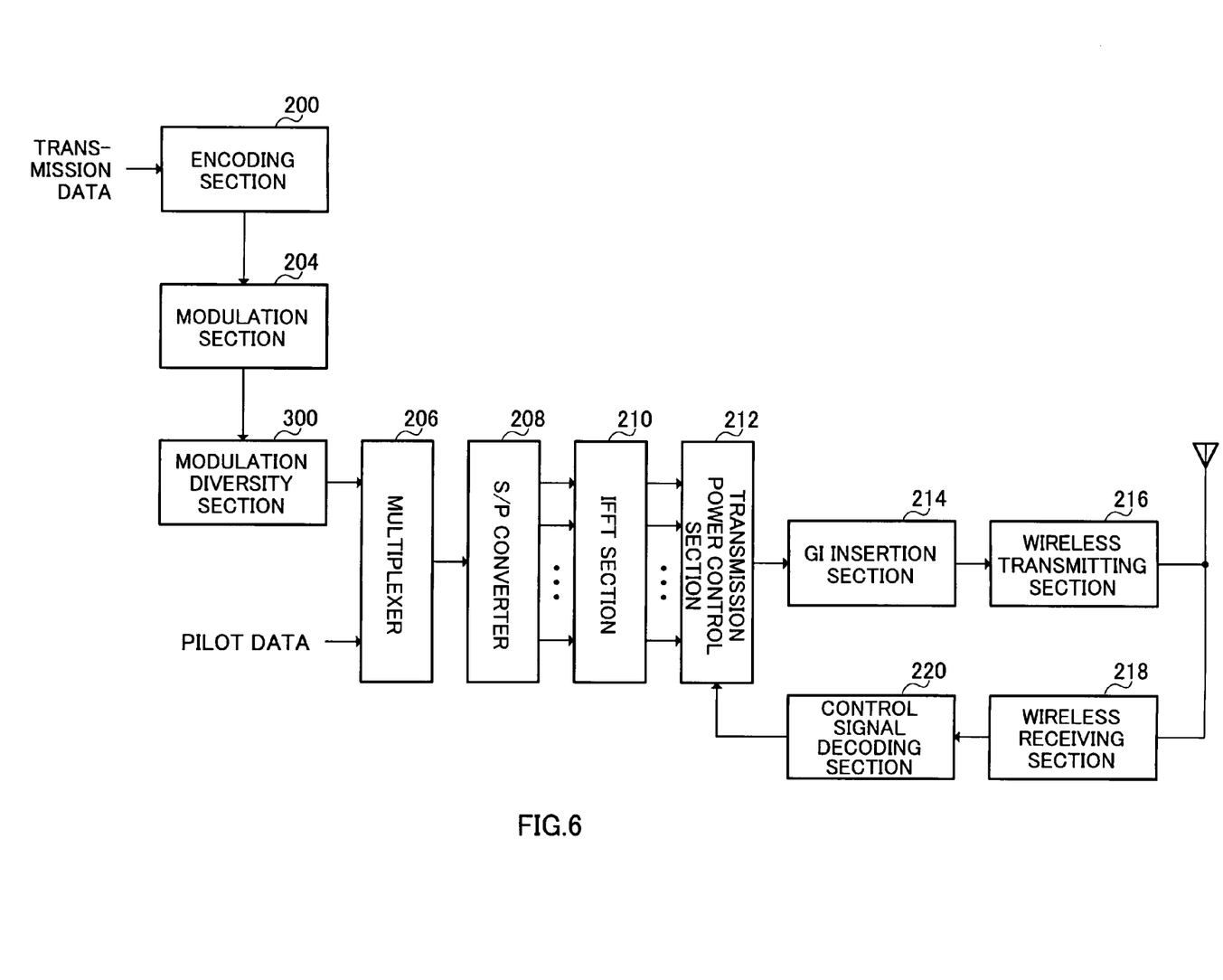
FIG. 6 is a block diagram showing the essential parts of a configuration for a transmission apparatus of a second embodiment.

FIG. 6 is a block diagram showing the essential parts of a configuration for a transmission apparatus of this embodiment. In the same drawing, portions the same as those of FIG. 4 are given the same numerals and are not described. The transmission apparatus of this embodiment has the configuration of the transmission apparatus of the first embodiment with repetition section 202 removed and a modulation diversity section 300 added.

Modulation diversity section 300 separates symbols obtained as a result of modulation by modulation section 204 into I components and Q components, combines by substituting either one of these components with another symbol component and outputs the result.

Figure 7:
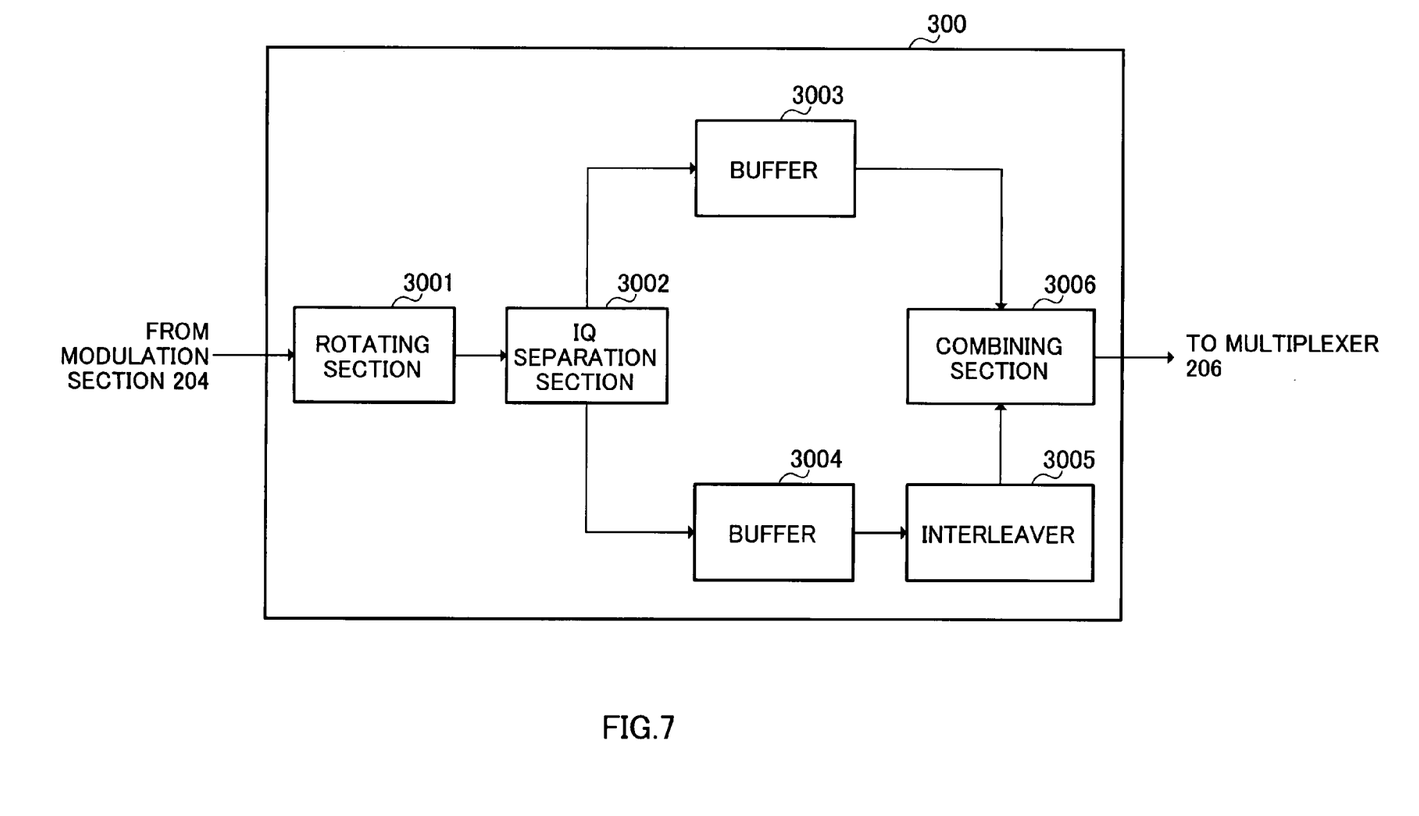
FIG. 7 is a block diagram showing an internal configuration for a modulation diversity section of the second embodiment.

Specifically, as shown in FIG. 7, modulation diversity section 300 is comprised of rotating section 3001, IQ separation section 3002, buffer 3003, buffer 3004, interleaver 3005, and combining section 3006.

Rotating section 3001 rotates symbols modulated using the QPSK method by the modulation section 204 through 26.6 degrees in an IQ plane. As a result, the position of a symbol then moves to some point on a 16QAM signal point arrangement. Further, by carrying out movement in this manner, it is possible to specify symbol position from just one of an I component or Q component of a symbol.

IQ separation section 3002 separates an I component and Q component of a symbol after separation.

Buffer 3003 temporarily stores separated I components of symbols.

Buffer 3004 temporarily stores separated Q components of symbols.

Interleaver 3005 interleaves a Q component stored in buffer 3004 and decides upon a Q component to be combined with an I component outputted from buffer 3003. A description is now given of interleaving performed by interleaver 3005.

As an example, it is taken that symbols #1 to #6 modulated using the QPSK method are outputted in order from modulation section 204. At this time, after being rotated by rotating section 3001, I components #1 to #6 for each symbol are temporarily stored in buffer 3003, and Q components #1 to #6 are temporarily stored in buffer 3004.

Interleaver 3005 interleaves Q components #1 to #6, with, for example, Q component #4 being outputted at the same time as I component #1 is outputted from buffer 3003. After this, interleaver 3005 outputs Q component #5 at the same time as I component #2, outputs Q component #6 at the same time as I component #3, outputs Q component #1 at the same time as I component #4, outputs Q component #2 at the same time as I component #5, and outputs Q component #3 at the same time as I component #6. Namely, interleaver 3005 pairs symbols outputted by modulation section 204 into groups of two, and performs interleaving in such a manner that only one of an I component of a Q component is substituted between this pair of symbols.

Combining section 3006 combines I components outputted from buffer 3003 and Q components outputted from interleaver 3005 and outputs this to multiplexer 206.

In this embodiment, a difference from the first embodiment is that transmission data is modulated by the QPSK method rather than carrying out repetition on the transmission data. However, each symbol is moved to some point of a 16 QAM signal point arrangement as a result of symbol positions being rotated in an IQ plane by rotating section 3001. A moved symbol is replaced with a symbol constituting a pair with the Q-component of this symbol and is outputted from modulation diversity section 300.

By doing this, in the case where each symbol is superimposed with a subcarrier of a different frequency and transmitted, the possibility of one of the I component or the Q component being correctly received without being subjected to the influence of fading can be made high. If one of the I component or the Q component is correctly received, it is possible to specify symbol position in the IQ plane of the original symbol.

Next, a description is given of a transmission power control operation for transmission apparatus of the configuration described above.

First, transmission data is encoded by encoding section 200 and modulated using the QPSK method by modulation section 204. A symbol obtained by modulation using the QPSK method is then rotated through 26.6 degrees by rotating section 3001 within modulation diversity section 300, and separated into an I component and a Q component by IQ separation section 3002.

The separated I component and Q component are then temporarily stored in buffer 3003 and buffer 3004 respectively. After this, continuing on, I components and Q components for symbols modulated using the QPSK method are stored in buffer 3003 and buffer 3004, respectively.

When I components and Q components corresponding to a predetermined number of symbols are stored, the I component stored first is output from buffer 3003 to combining section 3006. On the other hand, stored Q components are outputted from buffer 3004 to interleaver 3005 and interleaved, and Q components for symbols constituting pairs with symbols containing I components outputted to combining section 3006 are outputted to combining section 3006. As a result, each symbol is substituted with a symbol with which the Q component constitutes a pair and is outputted to multiplexer 206.

Symbols outputted from modulation diversity section 300 are multiplexed with existing pilot data by multiplexer 206, serial/parallel converted by S/P converter 208, and a plurality of multiplexed symbols are outputted in parallel to IFFT section 210.

Serial/parallel conversion by S/P converter 208 is carried out by symbols constituting pairs where Q-components are mutually substituted being superimposed with subcarriers constituting pairs. In the event of the above example, rather than carrying out serial/parallel conversion where a symbol composed of I component #1 and Q component #4 and a symbol composed of I component #4 and Q component #1 are superimposed with subcarriers of neighboring frequencies, conversion is carried out in such a manner so as to superimpose carriers of pairs with substantially different frequencies.

Multiplexed symbols outputted in parallel from S/P converter 208 are subject to inverse fast-Fourier transformation by IFFT section 210 so as to be superimposed with a plurality of subcarriers. At this time, symbols constituting pairs are respectively superimposed with pairs of subcarriers. Subcarriers for which multiplexed symbols are superimposed are outputted to transmission power control section 212 and transmission power control is carried out with respect to combined transmission power of pairs of subcarriers as with the first embodiment.

According to this embodiment, pairs of symbols obtained through modulation diversity are superimposed with respective pairs of subcarriers and combined transmission power of the pairs of subcarriers is increased or reduced. The range of fluctuation of transmission power is therefore made small so that convergence on a target transmission power can be rapidly achieved, and diversity results are also obtained by transmitting subcarriers where the I component and Q component for one symbol are of different frequencies.

In each of the above embodiments, a configuration is provided where an amount of control of combined transmission power is determined from combined received power of pairs of subcarriers at a receiving apparatus but, for example, it is also possible to feed back combined received power of each pair of subcarriers from the receiving apparatus and decide amount of control of combined transmission power taking into consideration loss occurring in a transmission path at the transmission apparatus. In this case also, the amount of information fed-back is equal to half the number of subcarriers and increase in the amount of information fed back can be prevented.

The above is a description of each of the embodiments of the present invention.

Each function block employed in the description of each of the aforementioned embodiments may typically be implemented as an LSI constituted by an integrated circuit. These functions may each be individually incorporated on a single chip or may also be incorporated on a single chip collectively or in their entirety.

Further, "LSI" is adopted here but this may also be referred to as "IC", "system LSI", "super LSI", or "ultra LSI" etc. depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application in biotechnology is also possible.

A configuration of a first aspect of a multicarrier communication apparatus of the present invention adopts a superimposing section superimposing corresponding transmission symbols with groups of subcarriers that are a plurality of subcarriers combined together in predetermined numbers, a control section controlling combined transmission power of the groups of subcarriers the transmission symbols are superimposed upon, and a transmission section transmitting multicarrier signals obtained by controlling the combined transmission power.

According to this configuration, because corresponding transmission symbols are superimposed with groups of subcarriers and transmission takes place by controlling combined transmission power of groups of subcarriers, the receiving apparatus only has to feed back information for transmission power control for each group of subcarriers. It is therefore possible to reduce the amount of information required for feedback and the transmission apparatus can reduce the range of fluctuation of transmission power of each subcarrier by distributing the amount of combined transmission power control for subcarrier groups evenly across each subcarrier belonging to the subcarrier group, and it is therefore possible to rapidly converge on the target transmission power.

A second aspect of the multicarrier communication apparatus of the present invention adopts a configuration where the superimposing section is comprised of an acquisition section acquiring only the number of subcarriers where the same transmission symbol is contained in the subcarrier group, wherein acquired same symbols are superimposed with each subcarrier of the subcarrier group.

According to this configuration, because the same symbols for a number of subcarriers contained in a subcarrier group are superimposed with each subcarrier of the group of subcarriers, the same symbol is transmitted by subcarriers of different frequencies and the influence of frequency-selective fading in the transmission path can be reduced.

A third aspect of a multicarrier communication apparatus of the present invention adopts a configuration where the acquisition section comprises a repetition section duplicating just transmission bits for a number of subcarriers contained in the sets of subcarriers, and a modulation section modulating duplicated transmission bits using an M-ary number corresponding to the number of subcarriers so as to acquire the same symbols as for the number of subcarriers.

According to this configuration, only transmission bits for the number of subcarriers contained in a subcarrier group are duplicated and modulation then takes place using an M-ary number corresponding to this number of subcarriers. The same symbols for the number of subcarriers contained in a subcarrier group can therefore be reliably generated.

According to a fourth aspect of a multicarrier communication apparatus of the present invention, the superimposing section comprises a separating section separating transmission symbols into in-phase components and orthogonal components, and a combining section substituting and combining one of the in-phase component and orthogonal component obtained through separation with a symbol to be paired with the transmission symbol. Here, the transmission symbol after combination and the symbol to be paired with the transmission symbol are superimposed with each subcarrier of the subcarrier group.

According to this configuration, the transmission symbols are separated into in-phase components and orthogonal components. One of these components is then substituted with the symbol to constitute a pair, and the symbol after combination is superimposed with each subcarrier of the group of subcarriers. Respective in-phase components and orthogonal components of transmission symbols are then transmitted using subcarriers of different frequencies. It is therefore possible to reduce the influence of frequency-selective fading occurring in the transmission path.

In a fifth aspect of a multicarrier communication apparatus of the present invention, the control section controls combined transmission power in accordance with a command transmitted from a remote communication station indicating a difference in power between combined received power for the subcarrier group at the remote communication station and desired target received power.

According to this configuration, because combined transmission power is controlled in accordance with a command indicating a difference in power between combined received power for a group of subcarriers occurring at a remote communication station and desired target receiving power, it is possible for combined received power of a group of subcarriers at the remote communication station to rapidly converge with the desired target received power.

A sixth aspect of a multicarrier communication apparatus of the present invention adopts a configuration where the control section increases and decreases transmission power of each subcarrier in such a manner that power corresponding to the difference in power is distributed evenly across each subcarrier of a subcarrier group.

According to this configuration, transmission power is increased and decreased by distributing power corresponding to a difference in power evenly between each subcarrier of a group of subcarriers. It is therefore possible to make the range of fluctuation of transmission power small with respect to the case of carrying out transmission power control individually for each subcarrier where the range of fluctuation of transmission power is substantial.

A seventh aspect of a multicarrier communication apparatus of the present invention adopts a configuration where the control section controls the combined transmission power in accordance with combined received power information for the subcarrier groups notified by the remote communication station.

According to this configuration, combined transmission power is controlled according to combined received power information for a group of subcarriers notified of by a remote communication station. This means that only combined received power information is transmitted, and it is therefore possible to reduce the amount of arithmetic processing for controlling transmission power occurring at a remote communication station.

An eighth aspect of a multicarrier communication apparatus of the present invention adopts a configuration comprising a receiving section receiving a multicarrier signal containing a plurality of subcarriers, a measuring section measuring combined received power for groups of subcarriers formed by combining predetermined numbers of subcarriers contained in the multicarrier signal, a calculating section calculating a difference in power between the measured combined received power and desired target received power, and a notifying section notifying a remote communication station of the calculated difference in power.

According to this configuration, combined received power is measured every group of subcarriers, and a remote communication station is notified of difference in power between combined received power and desired target received power. The remote communication station then increases or decreases combined transmission power of groups of subcarriers only by power corresponding to the notified difference in power and it is possible to carry out rapid transmission power control.

A ninth aspect of a multicarrier communication apparatus of the present invention is further comprised of a combining section combining symbols superimposed on each subcarrier of the groups of subcarriers, and a demodulating section demodulating symbols acquired by combination.

According to this configuration, symbols superimposed with each subcarrier of a group of subcarriers are combined and demodulated. It is therefore possible to obtain reliable demodulation results for which the influence of frequency-selective fading is reduced.

A first aspect of a transmission power control method of the present invention comprises: a superimposing step of superimposing corresponding transmission symbols with groups of subcarriers that are a plurality of subcarriers combined together in predetermined numbers, a control step of controlling combined transmission power of the groups of subcarriers the transmission symbols are superimposed upon, and a transmission step of transmitting multicarriers signals obtained by controlling the combined transmission power.

According to this method, because corresponding transmission symbols are superimposed with groups of subcarriers and transmission takes place by controlling combined transmission power of groups of subcarriers, the receiving apparatus only has to feed back information for transmission power control for each group of subcarriers. It is therefore possible to reduce the amount of information required for feedback and the transmission apparatus can reduce the range of fluctuation of transmission power of each subcarrier by distributing the amount of combined transmission power control for subcarrier groups evenly across each subcarrier belonging to the subcarrier group, and it is therefore possible to rapidly converge on the target transmission power.

According to a second aspect of a transmission power control method of the present invention, in a transmission power control method controlling transmission power of a transmission apparatus using received power occurring at a receiving apparatus, the receiving apparatus receives a multicarrier signal containing a plurality of subcarriers, measures combined received power for groups of subcarriers formed by combining predetermined numbers of subcarriers contained in the multicarrier signal, measures combined received power for groups of subcarriers formed by combining predetermined numbers of subcarriers contained in the multicarrier signal, and notifies the transmission apparatus of the calculated difference in power. The transmission apparatus superimposes mutually corresponding transmission symbols with each subcarrier of the subcarrier groups, controls combined transmission power of the subcarriers the transmission symbols are superimposed with according to a difference in power notified of by the receiving apparatus, and transmits a multicarrier signal obtained by controlling the combined transmission power.

According to this method, the receiving apparatus measures combined received power each group of subcarriers and notifies a remote communication station of a difference in power between the combined received power and the desired target received power. The transmission apparatus superimposes mutually corresponding transmitted symbols onto the groups of subcarriers and performs transmission while controlling combined transmission power of the groups of subcarriers according to the difference in power given notification of by the receiving apparatus. It is therefore only necessary for the receiving apparatus to feed back information for transmission power control every group of subcarriers and it is therefore possible to reduce the amount of information it is necessary to feed back. The transmission apparatus is then capable of making the range of fluctuation of transmission power for each subcarrier smaller by evenly distributing the amount of combined transmission power control for the groups of subcarriers evenly across each subcarrier belonging to the groups of subcarriers and it is possible for convergence on a target transmission power to take place rapidly.

This specification is based on Japanese patent application No. 2003-295613, filed on Aug. 19, 2003, the entire content of which is expressly incorporated by reference herein.

INDUSTRIAL APPLICABILITY

The multicarrier communication apparatus, multicarrier communication system, and transmission power control method of the present invention are capable of reducing the amount of information required for feedback, making the range of fluctuation of transmission power smaller, and causing a target transmission power to be converged on in a rapid manner, and are therefore useful as a multicarrier communication apparatus, multicarrier communication system, and transmission power control method for individually controlling transmission power of a plurality of subcarriers.

The invention claimed is:

1. A multicarrier communication apparatus comprising:
a superimposing section that superimposes transmission symbols with a plurality of subcarrier groups, each of the plurality of subcarrier groups including a plurality of subcarriers;
a control section that controls a first combined transmission power of each of the plurality of subcarrier groups on which the transmission symbols are superimposed; and
a transmission section that transmits a multicarrier signal obtained by controlling the first combined transmission power of each of the plurality of subcarrier groups, wherein:
the control section increases or decreases, by a power control amount, a transmission power of each subcarrier of the plurality of subcarrier groups such that each of the plurality of subcarrier groups has the same second combined transmission power, the power control amount being a value obtained by dividing a difference between a combined received power for each of the plurality of subcarrier groups at a remote communication station and a desired target received power by a number of subcarriers included in each of the plurality of subcarrier groups.

2. The multicarrier communication apparatus according to claim 1, wherein:
the superimposing section comprises an acquisition section that acquires the same transmission symbols, a first number of the same transmission symbols being equal to a second number of the plurality of subcarriers of a corresponding subcarrier group; and
the superimposing section superimposes the acquired same transmission symbols with the plurality of subcarriers of the corresponding subcarrier group.

3. The multicarrier communication apparatus according to claim 2, wherein the acquisition section comprises:
a repetition section that duplicates a transmission bit; and
a modulation section that modulates the duplicated transmission bit using an M-ary number corresponding to the second number of the plurality of subcarriers of each of the plurality of subcarrier groups to acquire the same transmission symbols.

4. The multicarrier communication apparatus according to claim 2, wherein:
the superimposing section further comprises:
a separating section that separates each of the transmission symbols into an in-phase component and an orthogonal component; and
a substituting section that substitutes one of the in-phase component and the orthogonal component between the transmission symbols; and
the superimposing section superimposes the transmission symbols with the plurality of subcarrier groups after substituting the one of the in-phase component and the orthogonal component.

5. A transmission power control method performed by a multicarrier communication apparatus, the transmission power control method comprising:
superimposing transmission symbols with a plurality of subcarrier groups, each of the plurality of subcarrier groups including a plurality of subcarriers;
controlling a first combined transmission power of each of the plurality of subcarrier groups on which the transmission symbols are superimposed; and
transmitting a multicarrier signal obtained by controlling the first combined transmission power of each of the plurality of subcarrier groups, wherein:
a transmission power of each subcarrier of the plurality of subcarrier groups is increased or decreased by a power control amount such that each of the plurality of subcarrier groups has the same second combined transmission power, the power control amount being a value obtained by dividing a difference between a combined received power for each of the plurality of subcarrier groups at a remote communication station and a desired target received power by a number of subcarriers included in each of the plurality of subcarrier groups.

* * * * *